United States Patent [19]

Scott et al.

[11] 4,035,149

[45] July 12, 1977

[54] VAPOR BARRIERS FOR LIQUID CONSERVATION

[75] Inventors: Paul R. Scott; Wilmer D. Johnston; Jerome L. Kyrish, all of Houston, Tex.

[73] Assignee: Shell Oil Company, Houston, Tex.

[21] Appl. No.: 541,171

[22] Filed: Jan. 15, 1975

[51] Int. Cl.² .................................................. B01J1/18
[52] U.S. Cl. ................................... 21/60.5 R; 220/218
[58] Field of Search ........................ 21/60.5 R, 60.5 A; 202/236; 159/1S; 220/216, 218; 203/10, 11

[56] References Cited

U.S. PATENT DOCUMENTS

| 2,466,001 | 4/1949 | Burwell | 252/378 P X |
| 2,521,190 | 9/1950 | Stafford et al. | 252/378 P X |
| 2,764,603 | 9/1956 | Ahlbrecht | 21/60.5 R |
| 2,926,988 | 3/1960 | Hurley | 21/60.5 R |
| 3,146,060 | 8/1964 | Canevari | 21/60.5 R |
| 3,446,571 | 5/1969 | Oberholtzer | 21/60.5 R |

*Primary Examiner* — Wilbur L. Bascomb, Jr.
*Assistant Examiner* — Barry I. Hollander

[57] ABSTRACT

The evaporation of volatile non-aqueous liquids is inhibited by a floating layer of expanded cereal grains optionally treated with fluorocarbons or perlite treated with fluorocarbons.

4 Claims, No Drawings

VAPOR BARRIERS FOR LIQUID CONSERVATION

BACKGROUND OF THE INVENTION

Vapor losses from crude and product storage tanks result in serious material and economic losses as well as air pollution. Evaporation from the liquid surface occurs during the storage of crudes and products in cone roof tanks. The maximum concentration of the evaporated hydrocarbons in the vapor space of the tank is determined by the vapor pressure of the liquid at the surface. The vapor pressure of the liquid is the saturation pressure exerted by vapors which are in equilibrium with the liquid. The maximum concentration or saturation concentration increases in direct proportion to the vapor pressure of the liquid at its free surface. Thus, the vapor losses should increase rapidly as the vapor pressure increases. These vapor losses include both "filling" and "breathing" losses. However, other forces in addition to vapor pressure are in action. Diffusion and convention of the hydrocarbon vapors from the surface throughout the vapor space is never complete. An essentially saturated vapor layer is in contact with the liquid surface. This saturated vapor layer slows the transfer of hydrocarbons to the vapor space above. Another mechanism, which often is the one controlling evaporation from crudes, is diffusion or transport of low molecular weight hydrocarbon compounds from the bulk of the liquid to the liquid-vapor interface. Evaporation lowers the concentration of these volatile hydrocarbons in the crude at the crude-vapor interface, thus lowering the vapor pressure and the saturation concentration. The transfer of additional high vapor pressure components from the body of the crude to the crude surface is generally slow relative to the vapor space.

It is known that evaporation losses may be reduced by floating a bulky material on the free surface of the liquid. Bulky low density materials are effective vapor barriers because (1) the portion of the material floating below the surface greatly impedes and thus decreases the transfer rate of the low molecular weight high vapor pressure components to the free surface of the stored petroleum where subsequent evolution can occur, and (2) the portion floating above the free surface greatly impedes the diffusion and convection of the evolved vapors from the free surface. Because of such actions, the evaporation losses from petroleum and products can be reduced substantially by floating low density particulate materials at the surface.

Analyses have shown that the composition of vapors evolved from medium gravity crudes are very similar. Data for several crudes show the vapors are similar to butane. About 80% volume or more of the hydrocarbons evolved are propane and heavier and have average molecular weights ranging from about 48 to 58. There appears to be no correlation between the composition of the vapors and either crude surface temperature, time of year, or crude type. Whereas the vapors lost from medium gravity crudes are slightly lower in molecular weight than butane (50 v 58), the vapors lost from gasoline are slightly higher than butane (65 v 58).

The use of bulky low-density materials as vapor barriers has been known for some time, and in the late 1950's the API Evaporation Loss Sub-committee III compiled many industry reports pertaining to the effectiveness of microballoons in reducing evaporation loss from field storage tanks. The microballoons were usually small phenolic balloons, less than one millimeter diameter, or urea balloons. In summary, it was found that for crude oils, one inch layers of microballoons reduced breathing losses 55% to 95% in stagnant tanks and evaporation losses in working tanks 50% to 85%. A reduction of 50% to 60% in evaporation loss for working tanks handling gasoline was reported when one- to two-inch layers of balloons were used. A major problem was loss of balloons due to water wetting and subsequent sinking, by becoming filled with fractions of the liquid on which they floated and subsequent sinking, and due to entrainment in the petroleum products taken from the tank. Another factor was cost effectiveness. These materials were expensive to install resulting in a payout time unfavorable to their use. Thus, microballoons were never used extensively throughout the industry.

The present invention in response to the above described need in the art overcomes the difficulties with microballoons and provides a successful solution to the problems of the art.

SUMMARY OF THE INVENTION

The primary purpose of this invention resides in reducing evaporation losses from stored non-aqueous liquids.

The above purpose has been achieved through inhibiting the evaporation of volatile non-aqueous liquids by covering the surface of the liquids with a floating layer of expanded cereal grains optionally treated with fluorocarbons or perlite treated with fluorocarbons.

Within the framework of the above described method, the present invention not only solves the above mentioned problems of the prior art, but also achieves further significant advantages.

DESCRIPTION OF PREFERRED EMBODIMENTS

It has now been found that bulky low-density materials such as expanded cereal grains, for example corn, rice and wheat, can be employed as highly effective vapor barriers. The expanded cereal grains can be used without further treatment, but a surface treatment with fluorocarbons, particularly fluorocarbon surfactants or fluorocarbon polymers, greatly improves their desirable characteristics as shown in Table 1 hereinafter.

TABLE 1

EVALUATION OF EXPANDED CEREAL GRAINS UTILIZING VM&P NAPHTHA

Sample Description:
Sample 1 - VM&P* Naphtha no cover
Sample 2 - VM&P Naphtha covered with 1.0-inch layer of rice previously treated with FSB*
Sample 3 - Same as 2 except wheat instead of rice
Sample 4 - Same as 2 except corn instead of rice

| Time, days | VM&P | Rice FSB | Wheat FSB | Corn FSB |
|---|---|---|---|---|
| 0.166 | 3.75 | 0.67 | 0.96 | 1.05 |
| 1.0 | 10.36 | 2.94 | 4.59 | 4.43 |
| 4 | 31.09 | — | 17.07 | 16.27 |
| 5 | 42.42 | 14.03 | 20.21 | 19.91 |
| 6 | 45.01 | 15.59 | 23.61 | 21.72 |
| 7 | 55.81 | 17.52 | 23.75 | 23.53 |

Loss to Vapor, % of Original

*VM&P is a 55° API Shell Stoddard solvent used in the paint industry.
FSB is Zonyl FSB - an amphoteric fluorosurfactant manufactured by Du Pont.

It has also been found, in addition to expanded cereal grains, that fluorocarbon treated perlite is a very effective vapor barrier. Whereas untreated perlite is not effective and tends to sink, perlite treated with fluorocarbons is both persistant and effective. As shown in Table 2 hereinafter, the treated perlite works very effectively in reducing vapor loss from VM&P naphtha. particles in accordance with the present invention. The adaptability of the present invention to various types of hydrocarbons is shown in Table 3 hereinafter, which shows vapor loss from model cone roof tanks.

TABLE 3

VAPOR LOSS FROM MODEL CONE ROOF TANKS

Hydrocarbons Tested:
1. VM&P Naphtha
2. Volatile Laden Sour Crude
3. Weeks Island Crude

| Test Duration, days | Vapor Barrier: | Loss to Vapor, % to Original | | | | |
|---|---|---|---|---|---|---|
| | | None (Reference) | Puffed Wheat | | Popcorn | | Perlite |
| | | | Untreated | Treated | Untreated | Treated | Treated |
| | | VM&P NAPHTHA | | | | | |
| 2 | | 0.39 | 0.01 | 0.01 | — | — | 0 |
| 4 | | 0.88 | 0.04 | 0.03 | — | — | 0.02 |
| 8 | | 1.19 | 0.04 | 0.03 | — | — | 0.02 |
| 12 | | 2.75 | 0.06 | 0.18 | — | — | 0.06 |
| | | VOLATILE LADEN CRUDE | | | | | |
| 2 | | 0.24 | 0.17 | 0.21 | — | — | 0.20 |
| 4 | | 0.27 | 0.18 | 0.21 | — | — | 0.20 |
| 8 | | 0.36 | 0.23 | 0.31 | — | — | 0.29 |
| 12 | | 0.90 | 0.59 | 0.65 | — | — | 0.68 |
| | | VOLATILE LADEN CRUDE | | | | | |
| 1 | | 2.14 | — | — | 0.05 | 0.09 | 0.09 |
| 2 | | 4.45 | — | — | 0.08 | 0.17 | 0.14 |
| | | WEEKS ISLAND CRUDE | | | | | |
| 1 | | 0.77 | — | — | 0.05 | — | — |

TABLE 2

EVALUATION OF PERLITE UTILIZING VM&P NAPHTHA

Sample Description:
Sample 1 - VM&P Naphtha with no cover
Sample 2 - VM&P Naphtha covered with 0.75-inch layer of Perlite
Sample 3 - VM&P Naphtha covered with 0.75-inch layer of Perlite which had previously been treated with DuPont Fluorosurfactant FSB

| | Loss to Vapor, % to Original | | |
|---|---|---|---|
| Test Time, Days | Sample 1 Blank | Sample 2 Untreated | Sample 3 FSB |
| 0.7 | 5.75 | 6.96 | 4.72 |
| 1.0 | 8.02 | 10.78 | 6.03 |
| 1.7 | 12.96 | Sank | 8.10 |
| 2.0 | 17.90 | | 9.00 |
| 4.6 | 38.60 | | 13.94 |
| 4.8 | 39.09 | | 14.14 |
| 5.6 | 47.73 | | 15.81 |
| 6.0 | 50.12 | | 16.41 |
| 6.6 | 56.39 | | 17.86 |
| 7.0 | 59.94 | | 18.48 |
| 7.6 | 65.57 | | 19.31 |
| 8.0 | 67.13 | | 19.84 |
| 8.75 | 69.04 | | 21.38 |
| 11.75 | 77.09 | | 31.29 |
| 12.75 | 80.42 | | 33.58 |
| 13.75 | 83.72 | | 35.23 |
| 14.75 | 86.72 | | 36.51 |

The non-aqueous volatile liquids to be protected in accordance with this invention include hydrocarbons, such as gasoline, kerosene and crude oil, hydrogenated derivatives of hydrocarbons such as carbon tetrachloride or perfluoroheptane, and esters and ethers such as ethyl acetate and diethyl ether. These liquids seldom contain more than traces or minor amounts of water and are not mixable with any substantial portion of water. The presence of such minor amounts of water does not appreciably affect the rates of evaporation of these liquids when covered with a floating layer of Cereal grains may be expanded by application of heat thereto. Well-known expanded grains are commercially available such as Quaker Puffed Rice and Quaker Puffed Wheat and popcorn.

Surface treating compounds employed are preferably fluorocarbons and include the following compounds: (1) Zonyl FSA (Anionic Fluorosurfactant made by Du Pont), (2) Zonyl FSB (Amphoteric Fluorosurfactant made by Du Pont), (3) Zonyl FSC (Cationic Fluorosurfactant made by Du Pont), (4) Zonyl FSN (Nonionic Fluorosurfactant made by Du Pont), (5) Zonyl FSP (Anionic Fluorosurfactant made by Du Pont), (6) Du Pont TLF 2916 (A fluorocarbon polymer), and (7) Du Pont TLF 2979 (A fluorocarbon polymer). Perlite was found to be most effective when treated with Zonyl FSP and Du Pont TLF 2916.

Perlite is natural volcanic glass. When heated to 1500° to 2000° F, the 3%-4% w natural water content forms tiny steam bubbles in the softened glass causing it to "pop" or explode to roughly 15-20 times its original volume.

We claim as our invention:

1. A method for inhibiting evaporation of volatile non-aqueous liquids by covering the surface of said liquids with a floating layer of expanded cereal grain.

2. The method of claim 1 wherein said expanded cereal grain is selected from the group consisting of corn, rice, and wheat.

3. The method of claim 1 wherein the expanded cereal grain is coated with a fluorocarbon.

4. The method of claim 3 wherein the fluorocarbon is a fluorosurfactant.

* * * * *